United States Patent
Gusikhin et al.

(10) Patent No.: US 10,165,234 B2
(45) Date of Patent: Dec. 25, 2018

(54) VEHICLE SCRATCH DETECTION AND MONITORING

(71) Applicant: Ford Global Technologies, LLC, Dearborn, MI (US)

(72) Inventors: Oleg Yurievitch Gusikhin, Commerce Township, MI (US); Omar Makke, Lyon Township, MI (US); Patrick Lawrence Jackson Van Hoecke, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 30 days.

(21) Appl. No.: 15/427,779

(22) Filed: Feb. 8, 2017

(65) Prior Publication Data

US 2018/0227548 A1    Aug. 9, 2018

(51) Int. Cl.
 *H04N 7/18* (2006.01)
 *B60R 11/04* (2006.01)

(52) U.S. Cl.
 CPC ............ *H04N 7/188* (2013.01); *B60R 11/04* (2013.01); *H04N 7/181* (2013.01)

(58) Field of Classification Search
 CPC ......... H04N 7/188; H04N 7/181; B60R 11/04
 See application file for complete search history.

(56) References Cited

U.S. PATENT DOCUMENTS

| | | | |
|---|---|---|---|
| 6,150,927 A | 11/2000 | Nesbitt | |
| 2008/0316312 A1 | 12/2008 | Castillo et al. | |
| 2018/0165541 A1* | 6/2018 | Amico | G06K 9/6212 |

FOREIGN PATENT DOCUMENTS

| | | |
|---|---|---|
| CN | 2092457 U | 1/1992 |
| CN | 103802758 A | 5/2014 |
| CN | 103802787 A | 5/2014 |
| CN | 203601124 U | 5/2014 |
| CN | 204314957 U | 5/2015 |
| CN | 204788644 U | 11/2015 |
| CN | 205468778 U | 8/2016 |
| DE | 202008016237 U1 | 3/2009 |
| DE | 102010018039 A1 | 11/2010 |
| JP | H 06211108 A | 8/1994 |

OTHER PUBLICATIONS

Jake Polden, Shocking dashcam footage shows man with a pushchair running a Key along the side of an £100,000 Aston, Mail Online, (Aug. 17, 2015).
Search Report dated Aug. 1, 2018 for GB Patent Application No. GB 1801858.0 (5 Pages).

* cited by examiner

*Primary Examiner* — Nam D Pham
(74) *Attorney, Agent, or Firm* — James P. Muraff; Neal, Gerber & Eisenberg LLP (57) ABSTRACT

A method and apparatus are disclosed for vehicle scratch detection and monitoring. An example vehicle includes insulated wires located below an exterior surface, a communication device, a camera to capture an image of an area around the exterior surface, and a scratch detector. The scratch detector in the example vehicle detects a scratch on the exterior surface when at least one of the insulated wires is engaged and sends, via the communication device, a signal to activate the camera in response to the scratch detector detecting the scratch.

17 Claims, 5 Drawing Sheets

VEHICLE SCRATCH DETECTION AND MONITORING

TECHNICAL FIELD

The present disclosure generally relates to vehicles and, more specifically, to vehicle scratch detection and monitoring.

BACKGROUND

Typically, a body of a vehicle is painted (e.g. with an enamel paint) to protect the body from corrosion and to make the exterior surface of the vehicle a desired color. Oftentimes, the body is painted with three layers: a primer, a basecoat, and a clearcoat. The primer is applied directly to the body to protect the body from corrosion and to create a smooth surface to which the basecoat can easily adhere. The basecoat includes the desired color. The clearcoat is a layer applied on top of the basecoat to protect the basecoat and provide a finish (e.g. glossy, matte, etc.).

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

An example vehicle includes insulated wires located below an exterior surface, a communication device, and a camera to capture an image of an area around the exterior surface. The example vehicle also includes a scratch detector to detect a scratch on the exterior surface when at least one of the insulated wires is engaged and to send, via the communication device, a signal to activate the camera in response to the scratch detector detecting the scratch.

An example method includes detecting a scratch on an exterior surface of a vehicle via insulated wires located below the exterior surface of the vehicle; sending, via a communication device, a signal to a camera in response to detecting the scratch; and capturing, via the camera, an image of an area around the vehicle in response to the camera receiving the signal.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

An exterior surface of a vehicle, such as a car, is generally a painted surface. The body of the vehicle may be made of metallic (e.g steel or aluminum) and/or nonmetallic material (e.g. carbon fiber). Further, the body typically is painted or coated with layers of a primer, a basecoat, and a clearcoat. The primer is applied directly to the body to protect the exterior surface from corrosion and to provide a smooth surface to which the basecoat can easily adhere. The basecoat provides the color. The clearcoat is a layer applied on top of the basecoat to protect the basecoat and provide a finish (e.g. glossy, matte, etc.).

While the clearcoat typically is relatively durable, it potentially may not prevent damage to the exterior surface. For example, a vandal with an object (e.g. a metal object such as a key) potentially can scratch through the clearcoat, the basecoat, and/or the body of the vehicle, thereby potentially causing damage that results in repair costs. In some instances, such damage may be inflicted discreetly as a person carrying the object walks past and scratches the vehicle. In such instances, it may be difficult to catch the perpetrator of the scratch. As used herein, a "scratch" refers to a scrape, a puncture, and/or any other marking to a painted exterior surface of a vehicle.

Example apparatus, methods, and systems as disclosed in more detail below detect and monitor scratches made to vehicles. The system includes a set of insulated wires (e.g. parallel, nonparallel, and/or intersecting wires) embedded in the surface of a vehicle and insulated from the body. As used herein, the term "insulated wire" refers to one or more conductive (e.g. copper) strands coated in a nonconductive material (e.g. plastic). The wires are connected to an energy storage device (e.g. a battery) and a scratch detector. The scratch detector is communicatively coupled with a communication device (e.g. an RF transmitter such as an RFID tag). When the surface of the vehicle is scratched, a wire is engaged by the scratching device and the scratch detector detects such engagement. In turn, the scratch detector transmits, via the communication device, a signal indicating that a scratch has been detected. As used herein, an object "engages" a wire when the object severs the wire and/or causes the wire to electrically contact the body of a vehicle.

In some examples in which the body of the vehicle is conductive or non-conductive, a first (e.g. negative) pole of the energy storage device is connected to a first terminal of a voltage controlled switch. The scratch detector is connected to a second (e.g. positive) pole of the energy storage device in series with the wires. Further, first ends of wires are connected to the scratch detector and second ends of the wires are connected to control terminals of the voltage controlled switch. That is, the energy storage device, the set of wires, the scratch detector, and the voltage controlled switch (via the first pole and the control terminals) are connected in series. Furthermore, the scratch detector is connected in series between the second pole of the energy storage device and a second terminal of the voltage controlled switch to enable the scratch detector to detect scratches.

The voltage controlled switch is open when there is a voltage at each control terminal from the set of wires. When an object (e.g. a key) scratches the surface of the vehicle, the object severs a wire and, thus, causes a voltage to not be present at the corresponding control terminal. In turn, the voltage controlled switch closes to allow current to flow between the first and second terminals of the voltage controlled switch. Further, a circuit is closed between the energy storage device, the voltage controlled switch, and the scratch detector when the voltage controlled switch closes to enable the energy storage device to power the scratch detector and, thus, enable the scratch detector to detect a scratch on the surface of the vehicle. As used herein, a "closed circuit" and/or a "completed circuit" refer to a circuit that allows current to flow in an uninterrupted path. As used herein, "a broken circuit" and/or an "open circuit" refer to a circuit that does not allow current to flow in an uninterrupted path. Upon detecting the scratch, the scratch detector transmits a signal, via the communication device, to activate a camera. The signal is received by a receiver module of the vehicle and is subsequently sent to a camera module. The camera module activates a camera corresponding to the location of the scratch in order to capture an image or video of a person and/or an object that scratches the vehicle.

In other examples in which the body of the vehicle is conductive (e.g. made of metal), the first pole of the energy storage device is connected to the body of the vehicle. Further, the scratch detector is connected in series between the second pole of the energy storage device and the wires. Because the wires are insulated from the body, the circuit is open when the exterior surface is unscratched. The energy storage device, the scratch detector, the wires, and the body of the vehicle are connected in series to form a circuit that includes a break between the wires and the body. When a conductive object (e.g. a key) scratches the exterior surface of the vehicle, the object forms an electrical connection between the conductive material of one or more of the wires and the body of the vehicle to close the circuit. In turn, the energy storage device powers the scratch detector to enable the scratch detector to detect a scratch on the surface of the vehicle. Upon detecting the scratch, the scratch detector transmits a signal, via the communication device, to activate a camera. For example, the signal is received by the receiver module of the vehicle and is subsequently sent to the camera module, which activates a camera corresponding to the location of the scratch in order to capture an image or video of a person and/or an object that scratches the vehicle.

Figure 1:
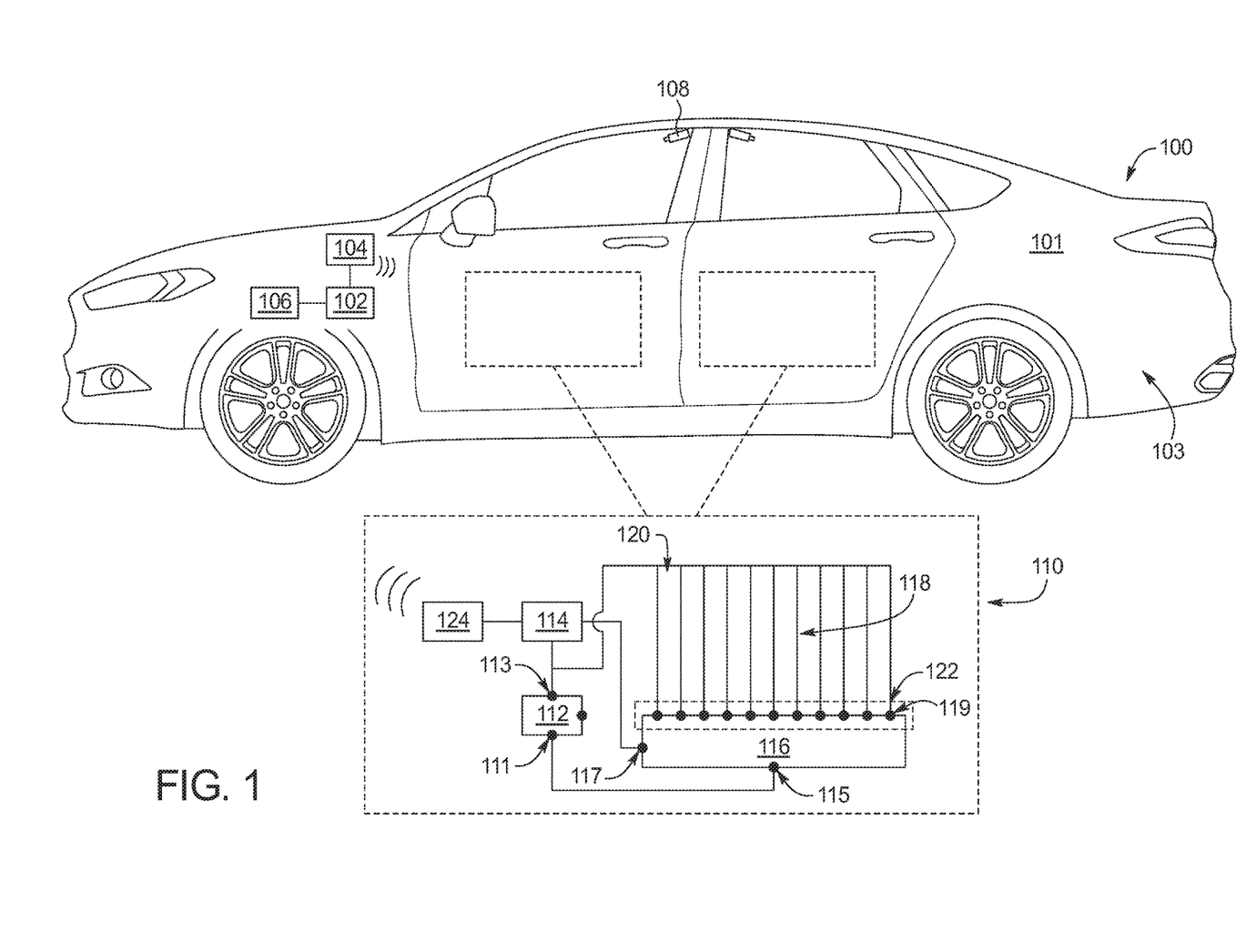
FIG. 1 is an illustration of a vehicle that includes an example scratch detection and monitoring system.

FIG. 1 is an illustration of a vehicle 100 that includes example scratch detection and notification systems. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example, the vehicle 100 includes an exterior surface 101, a body control module 102, a body 103, a receiver module 104, a camera module 106, a plurality of cameras 108, and scratch detection systems 110.

The body control module 102 controls various subsystems of the vehicle 100. For example, the body control module 102 may control power windows, power locks, an immobilizer system, and/or power mirrors, etc. The body control module 102 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. In the illustrated example, the body control module 102 is in communication with the receiver module 104 and the camera module 106.

In the illustrated example, the exterior surface 101 is formed from a layer of paint that coats the body 103 of the vehicle 100. The body 103 may be conductive and/or non-conductive. For example, the body 103 may be formed from conductive material such as steel and/or non-conductive material such as carbon fiber.

The receiver module 104 receives signals from the scratch detection systems 110. For example, the receiver module 104 may be a radio frequency (RF) receiver that receives RF signals from the scratch detection systems 110.

The camera module 106 controls the operation of cameras 108 in response to signals received by the receiver module 104. For example, when the receiver module 104 receives a signal from one of the scratch detection systems 110 indicating a scratch on the driver's side of the vehicle 100, the camera module 106 receives the signal from the receiver module 104 and activates one or more of the cameras 108 oriented to capture images of the area surrounding the driver's side of the vehicle 100.

In the illustrated example, the cameras 108 capture images and/or video. For example, the cameras 108 are oriented in order to capture images and/or video of an outside area surrounding the vehicle 100. The cameras 108 may be fixed position cameras or electronically controlled movable cameras. In the illustrated example, cameras 108 are positioned near windows on an interior ceiling of the vehicle 100 such that the cameras 108 are able to capture the area surrounding the vehicle 100. For example, one of the cameras 108 may be oriented to capture the area around the driver's side front door, and another of the cameras 108 may be oriented to capture the area around the driver's side back door, etc. In some examples, the camera module 106 adjusts a position and/or an orientation of one or more of the cameras 108 to enable the cameras 108 to capture a particular area surrounding the vehicle 100 in response to the signal from the receiver module 104.

In the illustrated example, each door of the vehicle 100 has a scratch detection system 110. In some examples, other areas (e.g. the rear quarter panels, the hood, etc.) of the exterior surface 101 of the vehicle 100 have scratch detection systems 110. Each of the scratch detection systems 110 of the illustrated example include insulated wires 118, an energy storage device 112, a scratch detector 114, a voltage controlled switch 116, and a communication device 124. The scratch detection systems 110 are located below the exterior surface 101 of the vehicle 100.

In the illustrated example, the insulated wires 118 are located below the exterior surface 101 of the vehicle 100 such that the insulated wires 118 are embedded in and insulated from the body 103 below the exterior surface 101.

The insulated wires 118 are arranged to form a grid (e.g. a pattern of parallel, nonparallel, and/or intersecting wires) such that scratching the exterior surface 101 engages one or more of the insulated wires 118. While the illustrated example shows the insulated wires 118 on the doors of the vehicle 100, the insulated wires 118 may be located below the exterior surface 101 at any other portion of the body 103 of the vehicle 100. Further, each of the insulated wires 118 has a first end 120 and a second end 122.

The energy storage device 112 has a first (e.g. negative) pole 111 and a second (e.g. positive) pole 113. The energy storage device 112 includes a battery, capacitor, and/or any other device that stores electric energy and maintains a voltage between the first pole 111 and second pole 113.

The voltage controlled switch 116 includes, for example, one or more MOS transistors, relays, and/or any other suitable electrical components. The voltage controlled switch 116 has a first terminal 115, a second terminal 117, and control terminals 119. In the illustrated example, the voltage controlled switch 116 is open when the voltage between each of the control terminals 119 and the first terminal 115 equals or approximately equals the voltage across the energy storage device 112. Further, the voltage controlled switch 116 is closed when the voltage between at least one of the control terminals 119 and the first terminal 115 equals or approximately equals zero.

The scratch detector 114 of the illustrated example detects a scratch on the exterior surface 101. The scratch detector 114 is connected in series between the second pole 113 of the energy storage device 112 and the second terminal 117 of the voltage controlled switch 116. Further, the scratch detector 114 detects a scratch on the exterior surface 101 when a circuit including the energy storage device 112, the voltage controlled switch 116, and the scratch detector 114 has been closed or completed. For example, the scratch detector detects a scratch when current flows through the energy storage device 112, the voltage controlled switch 116 (via the first 115 and second 117 terminals), and the scratch detector 114. For example, the scratch detector 114 includes a current sensor, a voltage sensor, and/or any other device suitable for detecting a closed circuit and sending a corresponding signal via the communication device 124.

The communication device 124 transmits the signal from the scratch detector 114 to the receiver module 104. For example, the communication device 124 includes an RF device that sends an RF signal to the receiver module 104 when the scratch detector 114 detects the scratch on the exterior surface 101 of the vehicle 100.

In the illustrated example, each of the first ends 120 of the insulated wires 118 is connected to the second pole 113 of the energy storage device 112. Each of the second ends 122 of the insulated wires 118 is connected to the control terminals 119 of the voltage controlled switch 116. Further, the voltage controlled switch 116 is connected at the first terminal 115 to the first pole 111 of the energy storage device 112. When none of the insulated wires 118 are engaged by an object, the voltage between each of the control terminals 119 and the first terminal 115 of the voltage controlled switch equals or approximately equals the voltage across the energy storage device 112.

In operation, when one or more of the insulated wires 118 is severed (i.e. when the exterior surface 101 is scratched) the voltage controlled switch 116 is closed. As used herein, an insulated wire 118 is "severed" when the insulated wire 118 is broken into separate parts such that there is no electrical continuity between the first end 120 and the control terminal 119 corresponding to the insulated wire 118.

When one or more insulated wires 118 are severed, the voltage between the control terminals 119 corresponding to the severed insulated wires 118 and the first terminal 115 of the voltage controlled switch 116 does not equal or approximately equal the voltage across the energy storage device 112. In turn, the voltage controlled switch 116 closes and a circuit including the energy storage device 112 and the scratch detector 114 is completed. The scratch detector 114 detects the presence of the scratch when a circuit is completed. Further, the scratch detector 114 sends a signal indicating that the scratch is detected via the communication device 124. In some examples, the signal includes an identifier to indicate where on the exterior surface 101 the scratch is located (e.g. front left door, rear right quarter panel, hood, etc.).

The receiver module 104 receives the signal sent via the communication device 124. Subsequently, the camera module 106 receives the signal from the receiver module 104 via the body control module 102 and controls operation of the cameras 108 to obtain images and/or video of an area near the detected scratch. One or more of the cameras 108 is activated based on the section of the vehicle 100 corresponding to the area of the exterior surface 101 that is scratched. The term "activate" as used herein refers to instructing the cameras 108 to capture images and/or video. The cameras 108 take images and/or video in order to facilitate identification of the party responsible for the damage. For example, the receiver module 104 may receive a signal from the scratch detector 114 of the scratch detection system 110 on the driver's side door. Upon receiving the signal indicating that the scratch detector 114 has detected the scratch, the camera module 106 activates one or more of the cameras 108 that is oriented in the direction of the driver's side door to record video and/or obtain images of the area around the detected scratch to facilitate identification of the person and/or object that has scratched the vehicle 100. In some examples, the camera module 106 adjusts the position and/or orientation of one or more of the cameras 108 to obtain the video and/or the images. Further, in some examples, the scratch detector 114 causes an alert to be sent to a user (e.g. via a mobile device) upon detecting a scratch. For example, the alert includes the location of the scratch and/or the location of the vehicle 100 (e.g., via a telematic control unit (TCU) of the vehicle 100).

Figure 2:
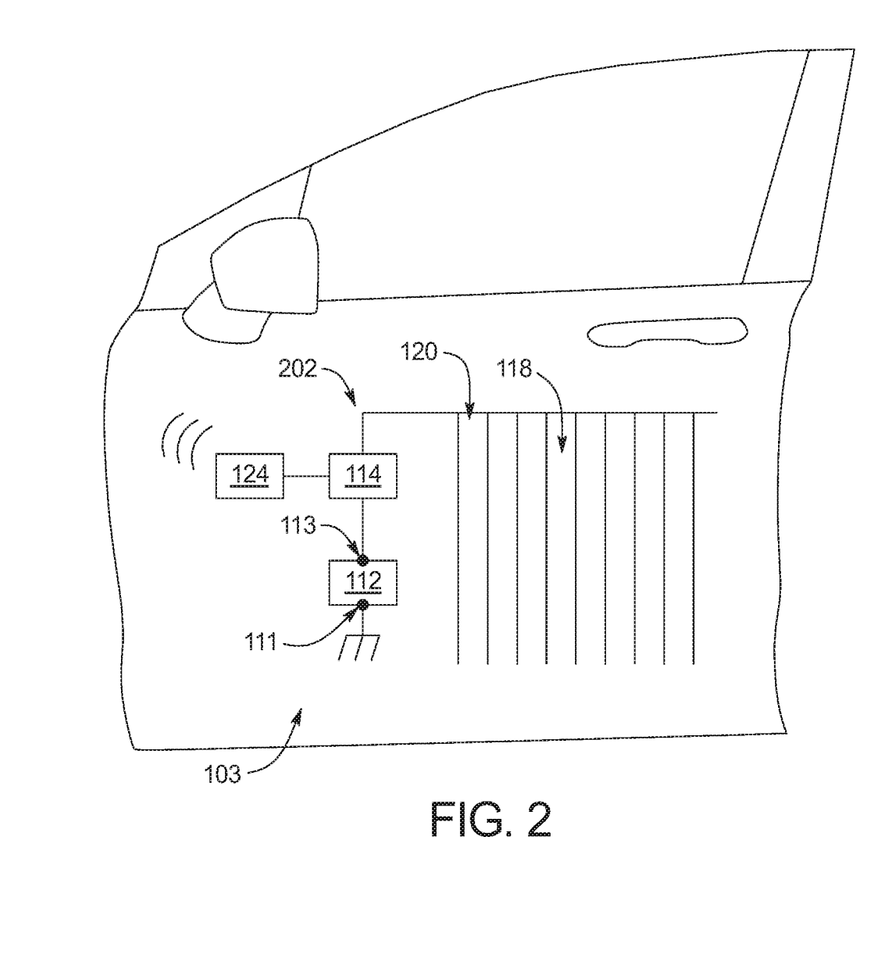
FIG. 2 is an illustration of a door of the vehicle of FIG. 1 that includes another example scratch detection and monitoring system.

FIG. 2 is an illustration of another scratch detection system 202. In the illustrated example, the body 103 is conductive. The first pole 111 of the energy storage device 112 is connected to the body 103 of the vehicle 100. The insulated wires 118 are connected at the first end 120 to the second pole 113 of the energy storage device 112. Further, the scratch detector 114 is connected in series between the second pole 113 and the first end 120. Additionally, the scratch detector 114 is configured such that the voltage at the first end 120 equals or approximately equals the voltage across the energy storage device 112.

In the illustrated example, an object (e.g. a key) that scratches the exterior surface 101 creates an electrical connection between the insulated wires 118 and the body 103 of the vehicle 100. For example, the object may break the insulation of the one or more of the insulated wires 118 or push one or more of the insulated wires 118 out of place to cause the conductive material of the one or more of the insulated wires to make contact with the body 103. Additionally or alternatively, if the object is formed from conductive material, the object may simultaneously touch the insulated wire 118 and the body 103. The electrical connection between the insulated wire 118 and the body 103 closes a circuit that includes the energy storage device 112 and the scratch detector 114. The scratch detector 114 detects the scratch in response to the circuit closing and sends, via the communication device 124, a signal to indicate that a scratch has been detected.

The receiver module 104 receives the signal sent via the communication device 124. Further, the camera module 106 receives the signal from the receiver module 104 via the body control module 102 and controls operation of the cameras 108 to obtain images and/or video of an area near the detected scratch. One or more of the cameras 108 is activated based on the section of the vehicle 100 corresponding to the scratched area of the exterior surface 101.

Figure 3:
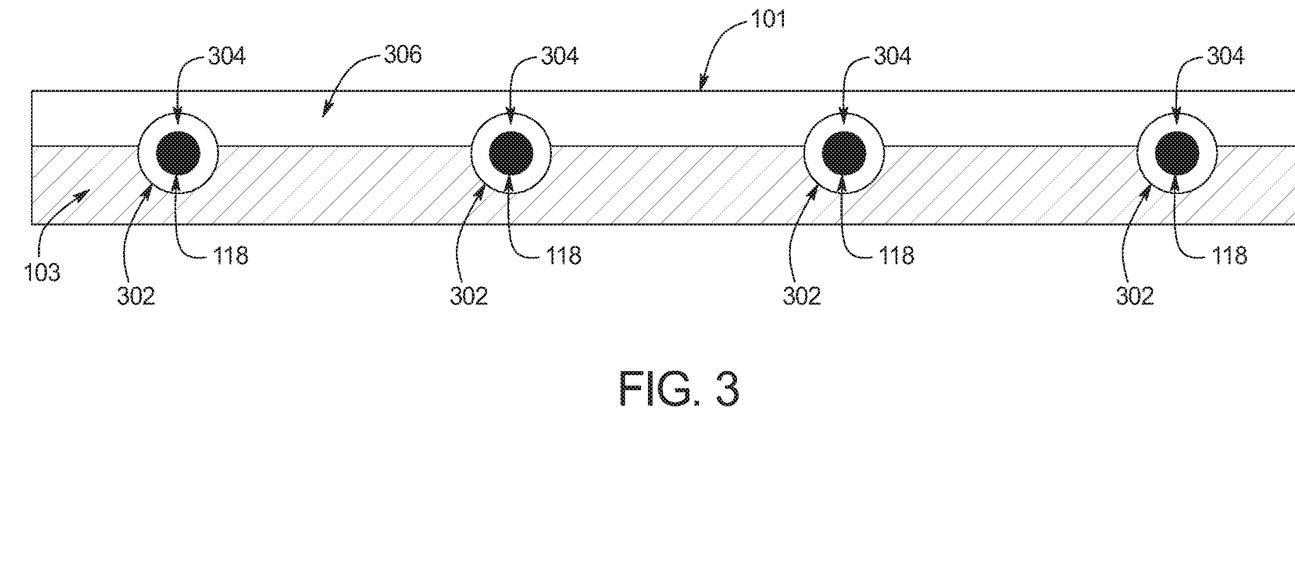
FIG. 3 is a partial cross-sectional illustration of the scratch detection and monitoring system of FIG. 1 and/or the example scratch detection and monitoring system of FIG. 2.

FIG. 3 is a partial cross-sectional view of a section of the exterior surface 101 and body 103 of the vehicle 100. As illustrated in FIG. 3, the body 103 contains grooves 302, and the insulated wires 118 are positioned in the grooves 302. In other examples, the body 103 may not include grooves such that the insulated wires 118 engage a flat surface of the body 103. The insulated wires 118 are coated with an insulating material 304 (e.g. the insulating material 304 may be epoxy). The body 103 and the insulated wires 118 are coated with a layer of paint 306 to form the exterior surface 101 of the vehicle 100. That is, the insulated wires 118 that enable detection of a scratch are positioned between the body 103 and the layer of paint 306.

Figure 4:
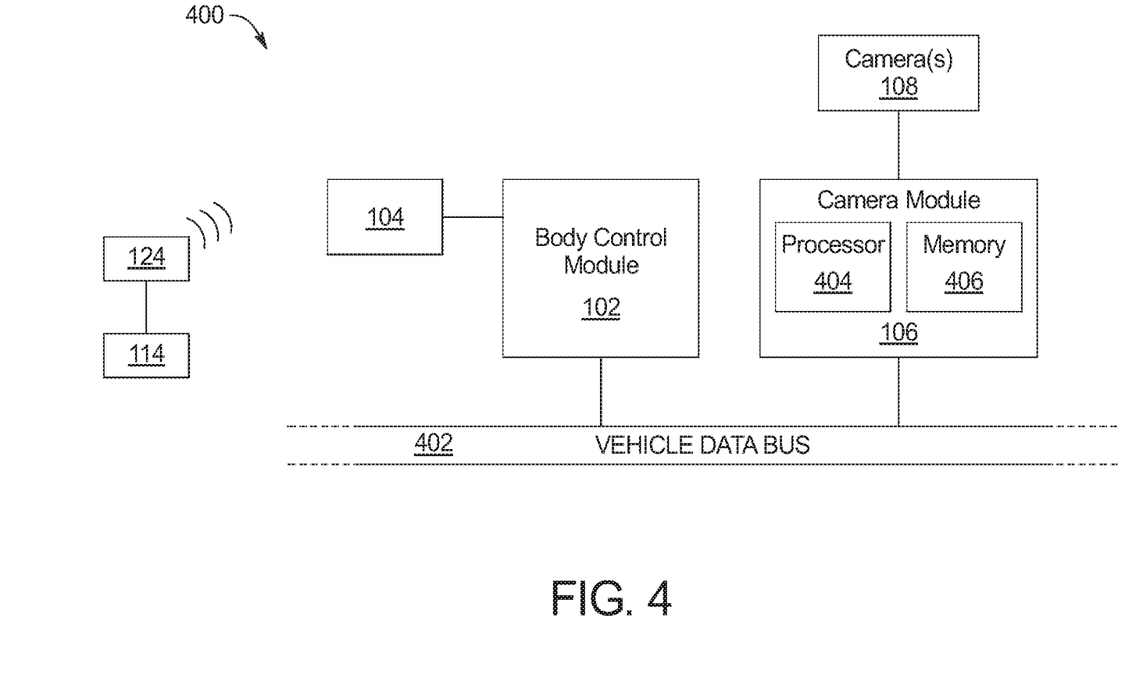
FIG. 4 is a block diagram of electronic components of the vehicle of FIG. 1.

FIG. 4 is a block diagram of electronic components 400 of the vehicle 100. The example electronic components 400 include a vehicle data bus 402, the body control module 102, the receiver module 104, the camera module 106, the cameras 108, and one of the scratch detection systems 110. In other examples, the electronic components 400 include one or more of the scratch detection systems 202 and/or one or more of the scratch detection systems 110.

The vehicle data bus 402 communicatively couples the body control module 102 and the camera module 106 to communicatively couple the scratch detector 114 and the cameras 108 via the communication device 124, the receiver module 104, the body control module 102, and the camera module 106. In some examples, the vehicle data bus 402 includes one or more data buses. The vehicle data bus 402 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

The camera module 106 includes a processor or controller 404 and memory 406. The processor or controller 404 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 406 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 406 includes multiple kinds of memory, particularly volatile memory and non-volatile memory.

The memory 406 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 406, the computer readable medium, and/or within the processor 404 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Figure 5:
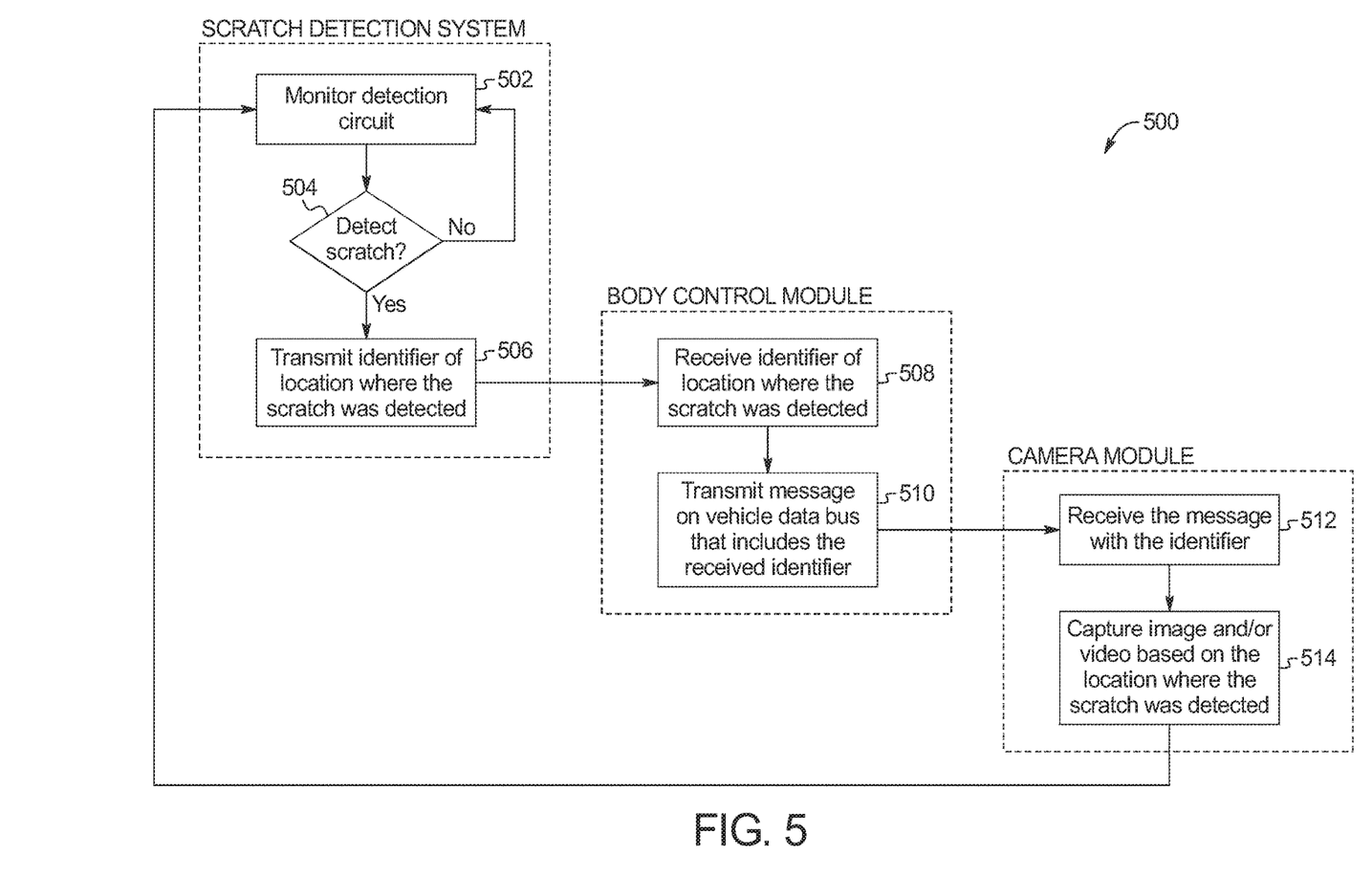
FIG. 5 is a flowchart of a method to implement the example scratch detection and monitoring system of FIG. 1 and/or the example scratch detection and monitoring system of FIG. 2.

FIG. 5 is a flowchart of a method 500 for detecting and monitoring a scratch on a vehicle. For example, the flowchart of FIG. 5 may be representative of machine readable instructions in memory that comprise one or more programs that, when executed by a processor, cause the vehicle 100 to detect and monitor a scratch on the vehicle 100. Further, although the example program is described with reference to the flowchart illustrated in FIG. 5, many other methods of implementing the example scratch detection and monitoring may alternatively be used. For example, the order of execution of the blocks may be changed, and/or some of the blocks described may be changed, eliminated, or combined.

Initially, at block 502, the scratch detector 114 monitors for a scratch indicator (e.g. current flow). At block 504, if the scratch detector 114 has detected a scratch, the method 500 proceeds to block 506. If the scratch detector 114 has not detected a scratch, the method 500 returns to block 502.

At block 506, the scratch detector 114 sends a signal, via the communication device 124, to indicate that a scratch has been detected. In the illustrated example, the signal includes an identifier of the location where the scratch was detected (e.g. driver's side door, hood, etc.). For example, if a scratch detection system 110 located on a front door detects a scratch, the signal sent from the corresponding scratch detector 114 includes an identifier associated with the front door. At block 508, the body control module 102 receives the signal from the scratch detector 114 via the receiver module 104. At block 510, the body control module 102 transmits the signal to the camera module 106.

At block 512, the camera module 106 receives the signal transmitted via the body control module 102. At block 514, the camera module 106 causes one or more cameras 108 to capture video or images. In the illustrated example, the one or more cameras 108 activated by the camera module 106 is based on location information included in the signal that is sent when the scratch is detected. The method 500 returns to block 502 upon completing block 514.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   insulated wires located below an exterior surface of the vehicle;
   a communication device;
   a camera to capture an image of an area around the exterior surface; and
   a scratch detector to:
      detect a scratch on the exterior surface when at least one of the insulated wires is engaged; and
      send, via the communication device, a signal to activate the camera in response to the scratch detector detecting the scratch.

2. The vehicle of claim 1, wherein the scratch detector detects the scratch in response to a circuit closing, wherein the circuit includes the scratch detector, a body of the vehicle, and the insulated wires, and wherein the circuit closes when conductive material of at least one of the insulated wires is electrically connected to the body.

3. The vehicle of claim 1, wherein the scratch detector detects the scratch in response to a circuit breaking, wherein the circuit includes the insulated wires and a voltage controlled switch, and wherein the circuit breaks when at least one of the insulated wires is severed.

4. The vehicle of claim 1, wherein the communication device is an RF device.

5. The vehicle of claim 1, wherein the communication device includes an identifier in the signal corresponding to a location of the scratch in the signal.

6. The vehicle of claim 5, wherein the camera is activated to capture an area adjacent to the location of the scratch in response to a camera module receiving the identifier corresponding to the location.

7. The vehicle of claim 6, wherein the camera module adjusts at least one of a position and an orientation of the camera in response to receiving the identifier corresponding to the location of the scratch.

8. The vehicle of claim 1, further including a plurality of cameras that includes the camera.

9. The vehicle of claim 1, wherein the scratch detector is to send, via the communication device, an alert to a user indicating that the scratch detector has detected the scratch.

10. A method comprising:
    detecting a scratch on an exterior surface of a vehicle via insulated wires located below the exterior surface of the vehicle when at least one of the insulated wires is engaged;
    sending, via a communication device, a signal to activate a camera in response to detecting the scratch; and
    capturing, via the camera, an image of an area around the vehicle in response to the camera receiving the signal.

11. The method of claim 10, wherein detecting the scratch includes detecting a circuit being closed that includes the insulated wires and a body of the vehicle, wherein the circuit is closed when conductive material of at least one of the insulated wires is electrically connected to the exterior surface.

12. The method of claim 10, wherein detecting the scratch includes detecting a circuit being closed that includes the insulated wires and a voltage controlled switch, wherein the circuit is broken when one of the insulated wires is severed.

13. The method of claim 10, wherein sending the signal includes sending an RF signal.

14. The method of claim 10, wherein sending the signal includes including an identifier corresponding to a location of the scratch in the signal.

15. The method of claim 14, wherein the image includes an area adjacent to the location of the scratch corresponding to the identifier.

16. The method of claim 15, including adjusting at least one of an orientation and a position of the camera in response to receiving the identifier.

17. The method of claim 10, further including sending, via the communication device, an alert to a user in response to detecting the scratch.

* * * * *